United States Patent
Westhues et al.

(10) Patent No.: US 10,788,935 B2
(45) Date of Patent: Sep. 29, 2020

(54) MULTIPLEXING CAPACITANCE SENSING AND DISPLAY FUNCTIONALITY

(71) Applicant: Microsoft Technology Licensing, LLC, Redmond, WA (US)

(72) Inventors: Jonathan Westhues, Sunnyvale, CA (US); Amir Zyskind, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 161 days.

(21) Appl. No.: 15/863,688

(22) Filed: Jan. 5, 2018

(65) Prior Publication Data

US 2018/0260077 A1 Sep. 13, 2018

Related U.S. Application Data

(60) Provisional application No. 62/470,805, filed on Mar. 13, 2017.

(51) Int. Cl.
*G06F 3/044* (2006.01)
*G06F 3/041* (2006.01)
(Continued)

(52) U.S. Cl.
CPC ............ *G06F 3/0418* (2013.01); *G06F 3/044* (2013.01); *G06F 3/0412* (2013.01);
(Continued)

(58) Field of Classification Search
CPC .... G06F 3/0418; G06F 3/0416; G06F 3/0412; G06F 3/044; G06F 2203/04104; G06F 2203/04101; G06F 3/03545; G06F 2203/04106; G06F 2203/041; G09G 3/3648; G02F 1/13338
See application file for complete search history.

(56) References Cited

U.S. PATENT DOCUMENTS 8,836,666 B2 * 9/2014 Brosnan .................. G06F 3/044
345/174
9,164,641 B1 * 10/2015 Rowe .................... G09G 3/3655
(Continued)

OTHER PUBLICATIONS

Tomita, et al., "An in-cell capacitive touch sensor integrated in an LTPS WSVGA TFT-LCD", In Journal of the Society for Information Display, Aug. 21, 2012, 3 pages.

*Primary Examiner* — Carolyn R Edwards
(74) *Attorney, Agent, or Firm* — Alleman Hall Creasman & Tuttle LLP

(57) ABSTRACT

A touch-sensitive display device includes a capacitance-based touch sensor including a plurality of electrodes, a display including a plurality of pixels, an image source configured to output image frames at a video frame rate, and a controller. The controller is configured to perform capacitance measurements on the capacitance-based touch sensor in capacitance-measurement intervals of a touch-sensing frame, and perform display-write operations on the display to write each image frame to the display in display-write intervals of the touch-sensing frame that do not temporally overlap with the capacitance-measurement intervals of the touch-sensing frame. The controller is configured repeat the touch-sensing frame at a fixed touch-sensing frame rate that is different than the video frame rate.

14 Claims, 6 Drawing Sheets

(51) Int. Cl.
    *G06F 3/0354* (2013.01)
    *G02F 1/1333* (2006.01)
    *G09G 3/36* (2006.01)

(52) U.S. Cl.
    CPC ........ *G06F 3/0416* (2013.01); *G02F 1/13338* (2013.01); *G06F 3/03545* (2013.01); *G06F 2203/04101* (2013.01); *G06F 2203/04104* (2013.01); *G06F 2203/04106* (2013.01); *G06F 2203/04108* (2013.01); *G09G 3/3648* (2013.01)

(56) References Cited

U.S. PATENT DOCUMENTS

| | | | | |
|---|---|---|---|---|
| 9,360,511 B2* | 6/2016 | Van Lier | ............ | G01R 27/2605 |
| 9,442,330 B2 | 9/2016 | Huo | | |
| 9,465,496 B2* | 10/2016 | Mu | ............ | G06F 3/044 |
| 9,547,396 B2* | 1/2017 | Wang | ............ | G06F 3/044 |
| 9,552,068 B2* | 1/2017 | Aubauer | ............ | G06F 3/017 |
| 9,638,949 B1* | 5/2017 | Kim | ............ | G06F 3/0416 |
| 2014/0152328 A1* | 6/2014 | Erdogan | ............ | G06F 3/044 |
| | | | | 324/679 |
| 2015/0355762 A1* | 12/2015 | Tripathi | ............ | H04N 3/24 |
| | | | | 345/173 |
| 2015/0378509 A1* | 12/2015 | Choi | ............ | G06F 1/3262 |
| | | | | 345/173 |
| 2016/0092010 A1* | 3/2016 | Agarwal | ............ | G06F 3/0412 |
| | | | | 345/173 |
| 2016/0154515 A1* | 6/2016 | Mu | ............ | G06F 3/044 |
| | | | | 345/174 |
| 2017/0192580 A1* | 7/2017 | Jung | ............ | G02F 1/134363 |
| 2018/0059868 A1* | 3/2018 | Brahma | ............ | G06F 3/0418 |
| 2018/0164909 A1* | 6/2018 | Bae | ............ | G06F 3/0416 |
| 2018/0188863 A1* | 7/2018 | Yi | ............ | G06F 3/0416 |

* cited by examiner

MULTIPLEXING CAPACITANCE SENSING AND DISPLAY FUNCTIONALITY

CROSS REFERENCE TO RELATED APPLICATIONS

This application claims priority to U.S. Provisional Patent Application Ser. No. 62/470,805, filed Mar. 13, 2017, the entirety of which is hereby incorporated herein by reference for all purposes.

BACKGROUND

A wide variety of computing devices employ capacitance-based sensors together with display panels. This enhances the computing experience by enabling a user to interact with the computing device via touch inputs. Such devices can take on form factors varying from pocket-sized personal devices (e.g., smartphones) to large-format devices supported on stands or mounted to walls (e.g., a home computing/entertainment system). Touch interaction is provided by sensing of the user's body (e.g., fingers/hands) near or in contact with the display and, in some cases, additionally through use of a passive or active stylus.

DETAILED DESCRIPTION

Figure 1:
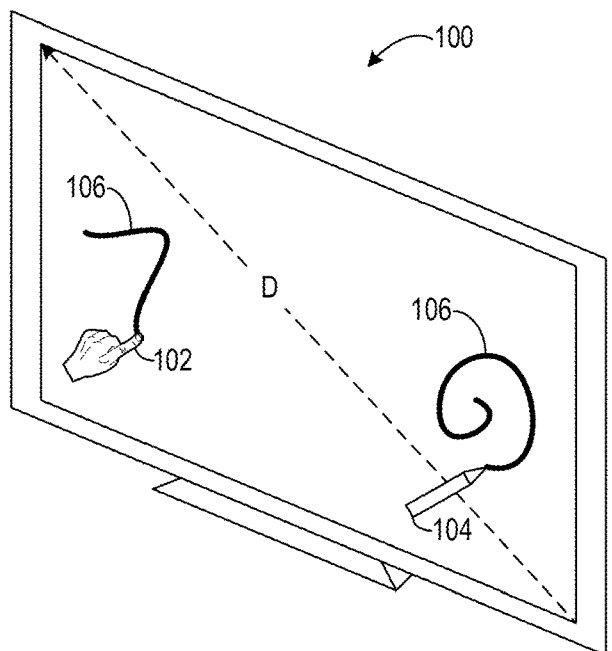
FIG. 1 shows an example display device including a touch sensor receiving touch inputs from a user's body and an active stylus.

Touch interactivity in touch-sensitive devices may be implemented by using electrodes to provide driving signals and interpret responses influenced by these signals. Such interpretation may be characterized as a measurement of a capacitance. Capacitance measurements may be made for various purposes. Measurement may be made, for example, to learn things about objects near or in contact with a display device touch sensor. Learned information may include: (1) position of the object; (2) proximity of the object, i.e., "hovering" distance away from the surface of the display; (3) size of the object, as inferred from its detected contact patch on the display device; (4) shape of the object, again inferred from the contact patch; (5) electrical properties of the object, such as capacitance or the degree to which the object is electrically grounded; and (6) identity of the object, e.g., to discern one user from another; and (7) speed of the object, to name but a few examples.

Capacitance measurements are susceptible to noise. Among other sources, display activity can be a significant contributor to noise. This can require significant and costly countermeasures, such as increasing drive signal levels for touch sensing; use of sub-optimal drive or receive circuitry on the touch sensor to work around noise; and increased complexity in receive circuitry and processing to identify and filter noise. Some display/touch implementations involve electrodes that are used both for display activity and touch sensing. These implementations are also vulnerable to noise, and can complicate, or even prevent, simultaneous touch detection and display activity.

Therefore, in some capacitive-based touch-sensitive display devices, it may be desirable—in some cases, necessary—to time divide between (a) measuring capacitance and (b) writing an image to the display, such that the two operations do not happen simultaneously. Such time-division multiplexing may affect different types of touch-sensitive display devices differently. In an "out-cell" configuration where a capacitance sensor is laminated to the front of a liquid crystal display (LCD) or other electrically operated display, the display may couple noise into the touch sensor if the two operations are performed simultaneously. In a system that time divides the two operations, that noise may be significantly reduced or eliminated. In an "in-cell" configuration where capacitance measurement and display write may involve the same sets of electrodes, it may be difficult or impossible to perform the two operations simultaneously.

In either case, such time-division is typically accomplished by phase-locking the capacitance measurements and display-write operations. In particular, the display receives image frames from an image source (e.g., a GPU) at some video frame rate that is generally outside the display's control. The touch-sensing frame is phase-locked to that incoming video frame rate. As used herein, phase-locked means that the capacitance measurements are performed on a frame-by-frame basis with a fixed timing relative to when the image frame is output from the image source and written to the display. Since the capacitance measurements are phase-locked to the display-write operations, the timing of the capacitance measurements scales up or down with the video frame rate to maintain the fixed temporal relationship.

However, phase-locking the touch-sensing frame rate to the incoming video frame rate can cause various issues. For example, video display electronics may be designed in a way that produces significant random variation from a periodic reference signal, such as the video frame rate. This is referred to as "jitter." Phase-locking the touch-sensing frame rate to the video frame rate can therefore introduce the same degree of jitter into the touch-sensing frame. Typically, however, the capacitance measurements are less tolerant of jitter than display of an image frame, such that the phase locking can interfere with or corrupt the capacitance measurements. Furthermore, in implementations where a touch-sensitive display device is configured to detect input from a capacitance-based active stylus, it may be necessary to minimize jitter, because such jitter may be demodulated by phase-coherent detection to noise on the measured capacitances that would interfere with accurate detection of the active stylus. Such jitter typically may be mitigated by designing video electronics to provide low-jitter timing, or by recovering a low-jitter clock from the incoming video clock.

Accordingly, the present description is directed to a novel alternate approach for controlling a touch-sensitive display device such that measurements of capacitance are performed on a touch sensor of the device according to a fixed touch-sensing frame rate that is different than a video frame rate at which image frames are output from an image source of the device. In other words, the capacitance measurements are not phase-locked to the video frame rate. The fixed touch-sensing frame rate allows for capacitance measurements to be performed in intervals that occur on a fixed basis, thereby facilitating designs that minimize jitter without requiring undesirable modifications of video display electronics or introduction of other cost/complexity.

Other intervals in the touch-sensing frame—i.e., intervals not used for touch sensing—are allocated for display-write intervals in which display-write operations write image frames to the display. The amount of time in the touch-sensing frame that is allocated for display write operations may be sufficient to write an entire image frame to the display when the image frames are output from the image source at a designated video frame rate (e.g., a maximum incoming video frame rate). At lower video frame rates, some of the time allocated for display operations in the display-write intervals may be unused. As such, the present description contemplates various approaches for distributing such idle time among the display-write intervals in the touch-sensing frame. In some cases, idle time may be re-allocated for another purpose (e.g., to perform additional capacitance measurements or other electrostatic interactions).

FIG. 1 shows a touch-sensitive display device 100 that may be configured in the manner described above. Touch-sensitive display device 100 may be implemented in a variety of forms. For example, display device 100 may be implemented as a so-called "large-format" display device with a diagonal dimension of approximately 1 meter or greater, or in a mobile device (e.g., tablet, smartphone) with a diagonal dimension on the order of inches. Other suitable forms are contemplated, including but not limited to desktop display monitors, high-definition television screens, tablet devices, laptop computers, etc.

Touch-sensitive display device 100 may be configured to sense one or more sources of input, such as touch input imparted via a finger 102 and/or stylus 104. The stylus 104 may be passive or active. The finger 102 and the stylus 104 are provided as non-limiting examples of input modalities. Touch-sensitive display device 100 may be configured to receive input from styluses and fingers in contact with the display surface and/or "hovering" over the display surface. "Touch input" as used herein refers to both finger and non-finger (e.g., stylus) input, and to input supplied by input devices in contact with, and/or spaced away from but proximate to, touch-sensitive display device 100. In some examples, touch-sensitive display device 100 may be configured to receive input from two or more sources simultaneously, in which case the display may be referred to as a multi-touch display. Touch-sensitive display device 100 may include an image source configured to generate graphical output 106 based on display signals provided to the touch-sensitive display device 100.

Figure 2:
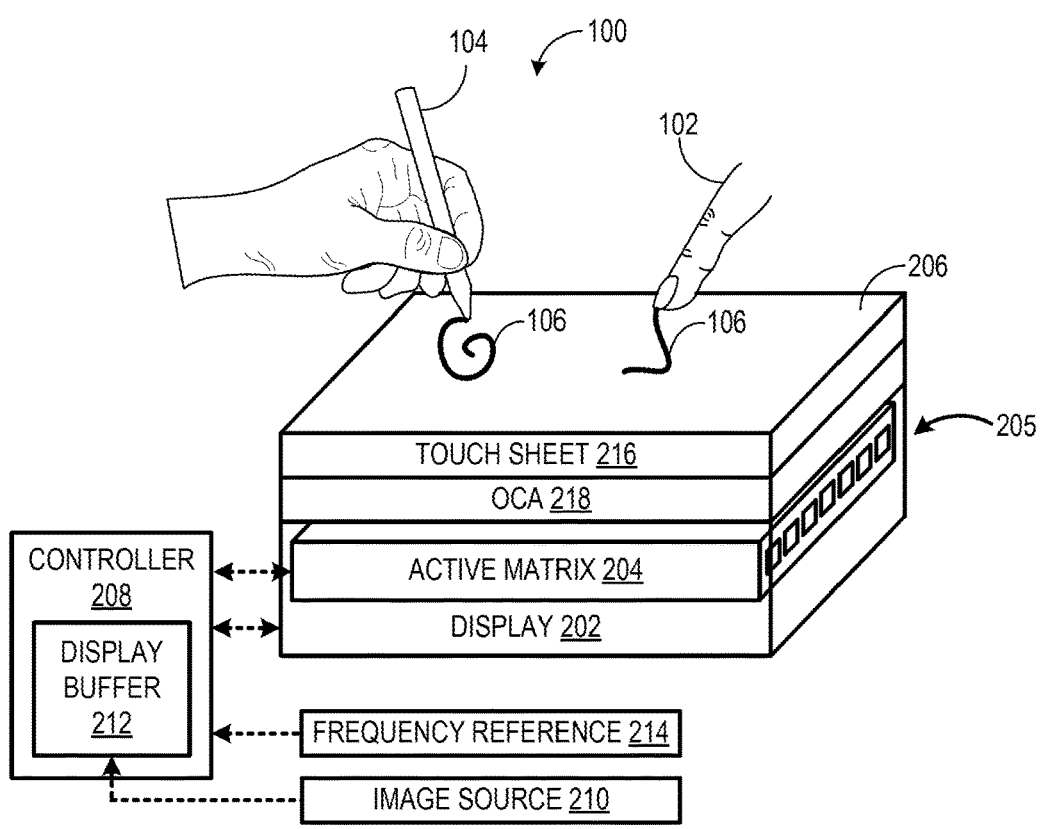
FIG. 2 shows an example touch-sensitive display device.

FIG. 2 schematically shows a block representation of touch-sensitive display device 100. The touch-sensitive display device 100 includes a display 202 including an active matrix 204 of pixels 205. Display 202 may be configured as a so-called "in-cell" touch sensor implementation in which one or more components of display 202 may be operated to perform both display output and input sensing functions. As a particular example, components of pixels 205 (e.g., activating electrodes) may be used both for capacitive touch sensing and image forming. When one or more of the pixel activating electrodes of active matrix 204 define a specific XY touch location on the display device, those activating electrodes may be referred to as a "sensel."

Display 202 is operable to emit light through display device 100, such that perceptible images can be formed at a surface 206 of the display device. For example, display 202 may assume the form of a liquid crystal display (LCD), or any other suitable display. To effect display operation, display 202 is operatively coupled to a controller 208, which may control pixel operation, refresh rate, drive and/or receive electronics, operation of a backlight, and/or other aspects of the display 202.

An image source 210 provides graphical content (e.g., image frames) for output by display 202. For example, image source 210 may be a computing device external to display device 100. In another example, image source 210 may be a hardware component integrated within display device 100. In one example, image source 210 is a graphics processing unit (GPU) that outputs image frames to controller 208 according to a designated video frame rate (e.g., a maximum rate of 60 Hz).

Controller 208 may include a display buffer 212 configured to store image frames as they are output from image source 210 according to the video frame rate. The image frames may be stored in display buffer 212 temporarily until controller 208 performs display-write operations to write each image frame to display 202. By storing the image frames in the display buffer 212, controller 208 is not bound to the video frame rate of image source 210, and instead can perform display-write operations at a different rate.

Controller 208 is configured to perform capacitance measurements and display-write operations periodically, usually via a group of events that occur repeatedly. The group of events may be characterized as a "frame" or "touch-sensing frame." The touch-sensing frame may include one or more capacitance measurement-intervals and one or more display-write intervals. The capacitance measurement interval(s) of the touch-sensing frame may be collectively sized such that all the measurement actions required to scan each sensel of active matrix 204 can be performed during each touch-sensing frame. In other words, the entire active matrix 204 can be scanned in a single touch-sensing frame. Furthermore, the display-write interval(s) of the touch-sensing frame may be collectively sized in duration to accommodate an entire image frame. Specifically, the duration may be selected so that all pixels 205 can be written to display 202 during each touch-sensing frame when image source 210 outputs image frames at a designated video frame rate (e.g., a maximum frame rate).

In many implementations, the video frame rate of the image source 210 can vary during operation to cause jitter. In order to prevent such jitter from interfering with touch-sensing operations, controller 208 is configured to repeat the touch-sensing frame at a fixed touch-sensing frame rate that is different than the video frame rate of image source 210. The fixed touch-sensing frame rate is determined based on a frequency reference 214. The frequency reference may take any suitable form. In one example, the frequency reference 214 includes an electronic oscillator circuit of controller 208. In some implementations, the frequency reference may be an excitation signal of an active input device in communication with the touch-sensitive display device 100, such as active stylus 104. In other words, the touch-sensing frame rate of touch-sensitive display device 100 may be set so as to cooperate with a frame rate used by active stylus 104.

When active matrix 204 is controlled to function as a display, controller 208 may perform display-write operations in display-write intervals of the touch-sensing frame by sending control signals to update a display state of pixels 205. Display-write operations may be performed on a pixel-by-pixel basis. More particularly, controller 208 may be configured to perform display-line-write operations by updating the state of each pixel 205 in a selected row of active matrix 204 to write display lines of an image frame to display 202. In some implementations, controller 208 may be configured to perform display-line-write operations at fixed rate. In other implementations, controller 208 may be configured to vary the rate at which display lines of an image frame are written to display 202.

When active matrix 204 is being controlled to function as a touch sensor, active matrix 204 is operable to receive touch input in capacitance-measurement intervals of the touch-sensing frame, which may assume various suitable form(s). As examples, active matrix 204 may detect (1) touch input applied by the finger 102 in contact with display surface 206 of display device 100; (2) a force and/or pressure applied by the finger 102 to the display surface 206; (3) hover input applied by the finger 102 proximate to but not in contact with display surface 206; (4) a height of the hovering finger 102 from the display surface 206, such that a substantially continuous range of heights from the display surface 206 can be determined; and/or (5) input from a non-finger touch source, such as an active stylus 104. In some examples, active matrix 204 may receive position, tip force, button state, and/or other information from stylus 104, and in some examples, may transmit information to the stylus. Active matrix 204 may be operable to receive input from multiple input sources (e.g., digits, styluses, other input devices) simultaneously. To enable input reception, active matrix 204 may be configured to detect changes associated with the capacitance of the plurality of pixels 205, as described in further detail below.

In the depicted implementation, the controller 208 is configured to control operation of the display 202 to provide both display output and input sensing functions. However, in other implementations, separate display and touch sensor controllers may be provided.

Touch inputs (and/or other information) received by active matrix 204 are operable to affect any suitable aspect of display 202 and/or a computing device operatively coupled to touch-sensitive display device 100, and may include two or three-dimensional finger inputs and/or gestures. As an example, FIG. 2 depicts the output of graphical content 106 by display 202 in spatial correspondence with paths traced out by the finger 102 and the stylus 104 proximate to display surface 206.

Display device 100 may include other components in addition to display 202. As an example, FIG. 2 shows the inclusion of an optically clear touch sheet 216. Touch sheet 216 may be comprised of any suitable materials, such as glass or plastic. Further, an optically clear adhesive (OCA) 218 bonds the touch sheet 216 to the display 202. As used herein, "optically clear adhesive" refers to a class of adhesives that transmit substantially all (e.g., about 99%) of incident visible light. Touch-sensitive display device 100 may include additional and/or alternative components.

Figure 3:
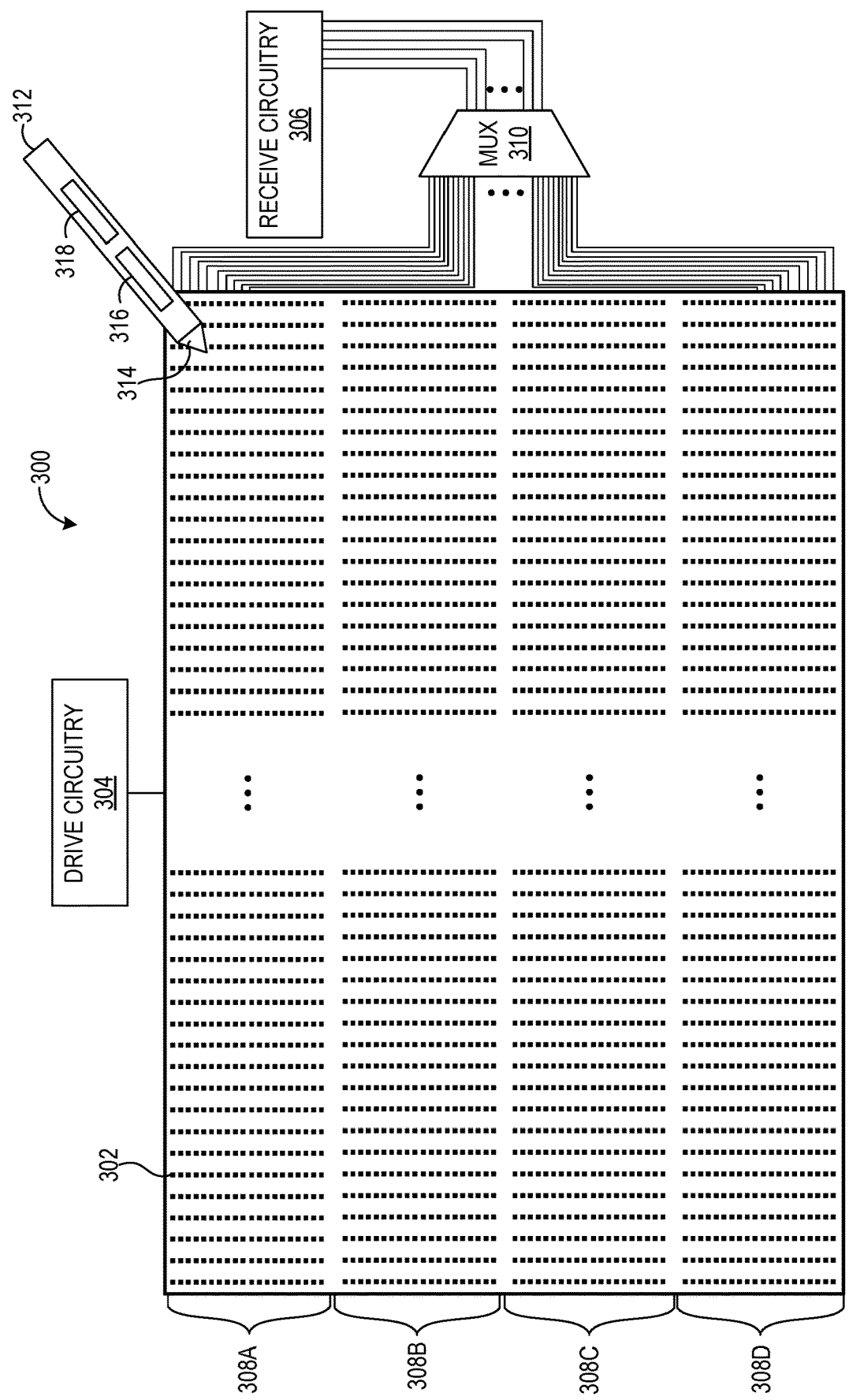
FIG. 3 shows an example in-cell touch sensor matrix.

FIG. 3 shows an example touch sensor 300. Touch sensor 300 includes a plurality of electrodes, such as electrode 302, one or more of which are selectively driven to receive input in one or more of the forms described above—e.g., touch, hover, force/pressure, stylus/active input device. FIG. 3 is described in the context of an in-cell implementation, in which touch sensor 300 may be configured as an in-cell sensor in combination with a display as described above. As such, touch sensor 300 may be implemented in active matrix 204 with capacitance-measuring electrodes that also operate to control display operations of pixels 205. However, touch sensor 300 may be implemented as an on-cell or out-cell touch sensor. For in-cell, on-cell, and out-cell implementations, the capacitance-measuring electrodes that resolve XY locations on the touch sensor are referred to herein as "sensels."

To enable sensel charging for touch-sensing functionality, the sensels are operatively coupled to drive circuitry 304. Via drive circuitry 304, each sensel is selectively driven with one or more drive signals. To enable sensing of touch input, the sensels are operatively coupled to receive circuitry 306.

Various capacitance measurements that enable sensing of touch input may be performed using drive circuitry 304 and receive circuitry 306. Such capacitance measurements may be performed during capacitance-measurement intervals of the touch-sensing frame. In particular, capacitance measurements may involve one or more electrical characteristics (e.g., capacitance, voltage, charge) of the sensels being influenced by driving via drive circuitry 304. Such influence is monitored via receive circuitry 306 to perform input sensing.

Receive circuitry 306 may perform self-capacitance measurements in which the driving and receiving is performed by the same electrode. Receive circuitry 306 may perform correlation operations on output received from the sensels. In one example, output from a given sensel may be used in a correlation operation after charging of the sensel for an integer number of iterations in an integration period. In general, this involves determining one or more reference signals that are associated with an event to be identified (e.g., a touch occurring in the presence of a particular type of noise). Then, at run time, when a signal is received, the received signal is correlated against the pre-determined reference signal to determine the degree to which the received signal corresponds to what would be expected if a touch were present. In the event of high correlation, the receiving system registers that a touch has in fact occurred. Alternatively or additionally, the sensel may be continuously monitored during charging. In either case, self-capacitance of the plurality of sensels is measured for input sensing.

In other implementations, receive circuitry 306 may perform mutual capacitance measurements between two or more electrodes, typically with drive signals applied on one or more transmit electrodes, and interpretation occurring on receiving electrodes. One well-known mutual-capacitance configuration is a touch sensor employing row and column matrix of electrode traces (an alternate configuration not depicted in FIG. 3). In any case, the driving signal and conditions around the electrode(s) influence the character of the received signal, thereby enabling those conditions to be interpreted (e.g., to identify presence and location of a touch).

Due to the relatively large number of sensels included in a typical implementation of touch sensor 300, a limited number of sensels are shown in FIG. 3 for simplicity/clarity. In practice, touch sensor 300 may include 20,000 or more sensels when implemented in a large-format display device. Touch sensor 300 may include any suitable number of sensels, however. In one example, touch sensor 300 includes 20,000 sensels arranged in 100 rows and 200 columns.

While it may be desirable to maximize sensing frequency by simultaneously measuring capacitance at each sensel, this would entail provision of significant processing and hardware resources. In particular, 20,000 receivers (e.g., analog-to-digital converters) in receive circuitry 306 would be needed to perform full-granularity, simultaneous self-capacitance measurements at each sensel. As such, partial-granularity, multiplexed approaches to self-capacitance measurement may be desired to reduce the volume of receive circuitry 306.

FIG. 3 illustrates one example approach to partial-granularity self-capacitance measurement in touch sensor 300, in which the sensels are grouped into horizontal bands 308A-308D, each having twenty-five rows of sensels. In this approach, self-capacitance measurements are temporally multiplexed via a multiplexer 310 such that a respective measurement time slot is provided for each band 308 within a particular capacitance-measurement interval in a touch-sensing frame. Accordingly, receive circuitry 306 may include a number of receivers equal to the number of sensels in a given band 308—e.g., 5,000 receivers. However, any suitable number and geometric grouping of sensels may be used in a multiplexing scheme to reduce the volume of receive circuitry. Further, similar grouping may be performed to reduce the volume of drive circuitry 306, alternatively or in addition to the use of partial-granularity receive circuitry.

With an active stylus, capacitive coupling between one or more electrodes of the stylus and electrodes of touch sensor 300 may enable further functionality. Referring to active stylus 312, the stylus includes electrode tip 314 (and potentially additional electrodes) configured to capacitively couple with one or more electrodes 302 of touch sensor 300. Stylus 312 is configured to electrostatically transmit and/or receive signals to/from touch sensor 300 via electrode tip 314. Stylus 312 further includes receive circuitry 316 and transmit circuitry 318. Receive circuitry 316 is configured to interpret a response on electrode tip 314 when a waveform is driven on one or more electrodes 302 of the touch sensor 300. Touch sensor 300 may transmit waveforms to stylus 312 and vice versa in capacitance-measurement intervals of a touch-sensing frame.

Touch sensor 300 may transmit any suitable waveforms to communicate different types of information to stylus 312. For example, touch sensor 300 may transmit a synchronization waveform to enable stylus 312 to become synchronized with touch sensor 300 when stylus 312 is proximate to touch sensor 300. Transmit circuitry 318 is configured to drive electrode tip 314 to transmit one or more waveforms to touch sensor 300. Stylus 312 may transmit any suitable wave forms to communicate different types of information to touch sensor 300. In some examples, stylus 312 may transmit a waveform to touch sensor 300 to enable location determination of the stylus in capacitance-measurement intervals of a touch-sensing frame. In one example, the waveform is based on the drive signal applied to the sensels by drive circuitry 304, which, in the presence of a finger proximate to touch sensor 300, induces sensel output that is similar to output induced by the finger but opposite in polarity. In another example, the waveform transmitted by the stylus electrode to the sensels is orthogonal to the waveform produced by finger touch. These examples may enable simultaneous detection of stylus 312 and the finger by touch sensor 300.

In some implementations, the waveform transmitted by stylus 312 may be used by controller 208 (shown in FIG. 2) as a frequency reference to set a fixed frame rate at which the touch-sensing frame is repeated.

Generally, communication between stylus 312 and touch sensor 300 can be used to (1) determine the location of the stylus relative to the touch sensor; (2) send/receive synchronization signals to establish/maintain a shared sense of time between the stylus and the touch sensor; (3) communicate state/status between the stylus and digitizer such as identifiers, stylus button state, battery level and the like; and/or (4) transmit various other data, such as force determined in the stylus tip, firmware updates, encryption keys/information, time at which various events occur, etc. While not shown in FIG. 3, touch sensor 300 and stylus 312 may include components configured to enable radio communication therebetween, which may perform one or more of the functions described above and/or other functions.

Figure 4:
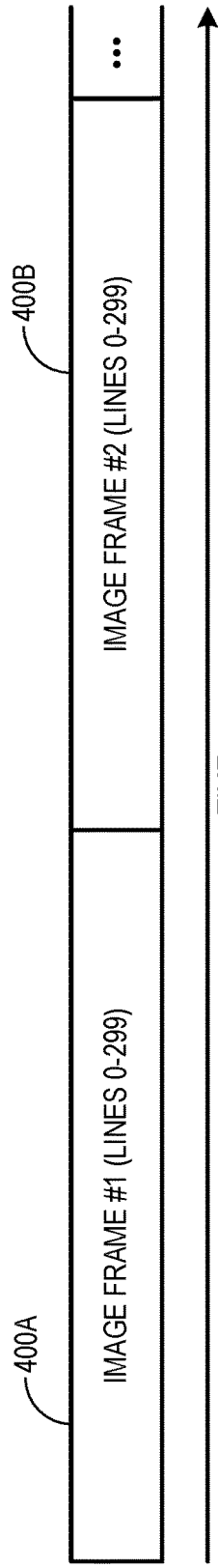
FIG. 4 shows example image frames output from an image source.

Touch sensor 300 provides display functionality and touch-sensing functionality by time-dividing between capacitance measurements and display-write operations. Time division is performed according to a touch-sensing frame that is asynchronous with a video frame rate at which image frames are output from an image source, such as image source 210 shown in FIG. 2. FIG. 4 illustrates example image frames 400 (e.g., 400A, 400B) that may be output from the image source. Each example image frame includes three hundred display lines (i.e., 0-299). The image source may output the image frames according to a designated video frame rate that may be set independent of the display and/or the controller. Generally, the designated video frame rate is a maximum or optimal video frame rate at which the image source outputs image frames. In one example, the designated video frame rate of the image source may be 60 Hz.

Figure 5:
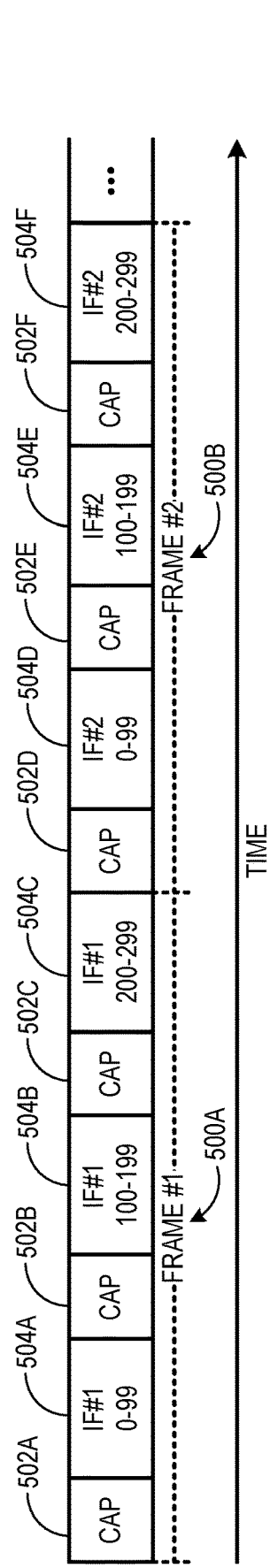
FIG. 5 shows example phase-locked touch-sensing frames.

FIG. 5 illustrates example touch-sensing frames 500 (e.g., 500A, 500B) that are phase-locked to the video frame rate of image source 210. Each example phase-locked touch-sensing frame 500 includes three capacitance-measurement intervals 502 (e.g., 502A, 502B, 502C in frame 500A and 502D, 502E, 502F in frame 500B) and three display-write intervals 504 (e.g., 504A, 504B, 504C in frame 500A and 504D, 504E, 504F in frame 500B). In this example, each three-hundred-line image frame 400 (shown in FIG. 4) is written to the display over the three display-write intervals 504 of the touch-sensing frame 500. In particular, display lines 0-99 of the image frame are always written to the display in the first display-write interval of each touch-sensing frame (e.g., interval 504A of frame 500A); display lines 100-199 of the image frame are always written to the display in the second display-write interval of each touch-sensing frame (e.g., 504B of frame 500A); and display lines 200-299 are always written to the display in the third display-write interval (e.g., 504C of frame 500A). In other words, on a frame-by-frame basis, the same portion of an image frame is written to the same portion of the display in a particular display-write interval.

Furthermore, capacitance measurements are performed during the capacitance-measurement intervals 502. Like in the display-write intervals 504, different portions of the display may be scanned for touch input during different capacitance-measurement intervals 502. Additionally, capacitance measurements to detect input from an active stylus may be performed in on or more of the capacitance-measurement intervals 502 of each touch-sensing frame 500. Since the capacitance-measurement intervals and the display-write intervals are phase-locked, any jitter on the touch-sensing frames 500 and/or the display-write intervals 504 may therefore appear as jitter on the capacitance-measurement intervals 502. Phase-locking the display-write operations with the capacitance measurement may therefore introduce unacceptable jitter into the timing of performing the capacitance measurements.

Figure 6:
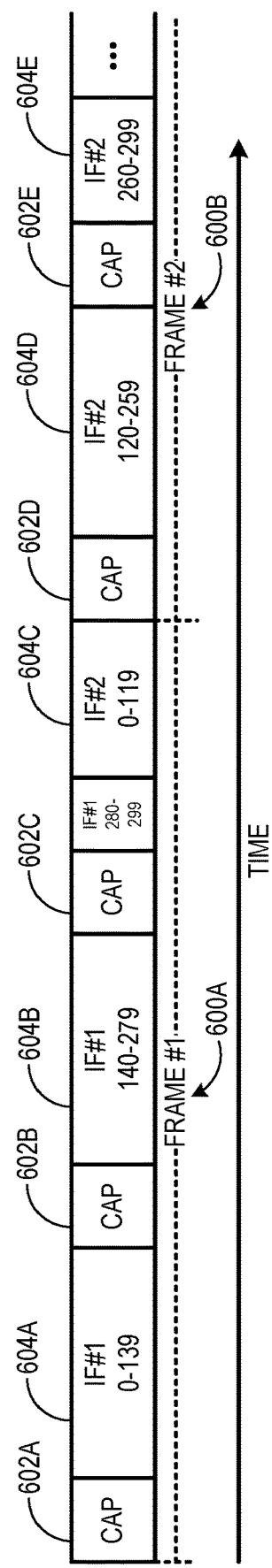
FIG. 6 shows example touch-sensing frames that are asynchronous with a video frame rate of an image source.

FIG. 6 illustrates example touch-sensing frames 600 (e.g., 600A, 600B) that are asynchronous with a video frame rate of image source 210. The touch-sensing frames 600 may be repeated by controller 208, shown in FIG. 2, at a fixed touch-sensing frame rate that is different than the video frame rate. For example, the fixed touch-sensing frame rate may be based on a frequency reference independent of image source 210, such as an electronic oscillator circuit or another reference source. In other words, capacitance-measurement intervals 602 can be performed at a fixed rate that is independent of the video frame rate. Each asynchronous touch-sensing frame 600 includes three capacitance-measurement intervals 602 (e.g., 602A, 602B, 602C in frame 600A and 602D, 602E, 602F in frame 600B) and three display-write intervals 604 (e.g., 604A, 604B, 604C in frame 600A and 604D, 604E, 604F in frame 600B). Capacitance-measurement intervals 602 of each touch-sensing frame 600 are collectively sized in duration to perform a scan of the entire display for touch input, as well as perform capacitive measurements for detecting input from an active stylus when applicable. In one example, if an active stylus is detected, capacitive measurements to detect passive touch inputs may be performed at 60 Hz and capacitive measurements to detect touch inputs from the active stylus may be performed at 60 Hz. If the active stylus is not detected, then the frequency of capacitive measurements to detect passive touch inputs may be increased to use up the remaining time in the capacitive-measurement intervals.

Once time in each touch-sensing frame 600 is allocated for capacitance measurement intervals 602, the remaining time in the touch-sensing frame may be allocated for display-write intervals. Each touch-sensing frame 600 may be constructed such that sufficient time is allocated for display-write intervals to write an entire image frame 400 to the display during a single touch-sensing frame when the image source is operating at the designated video frame rate (e.g., maximum video frame rate). In the illustrated example, display lines 0-139 of first image frame 400A are written to the display in first display-write interval 604A of first touch-sensing frame 600A; display lines 140-279 of first image frame 400A are written to the display in second display-write interval 604B of first touch-sensing frame 600A; display lines 280-299 of first image frame 400A and display lines 0-119 of second image frame 400B are written to the display in third display-write interval 604C of first touch-sensing frame 600A. Then, in first display-write interval 602 of second touch-sensing frame 600B, display lines 120-259 of second image frame 400B are written to the display, and so on.

The number of display lines written to the display in each display-write interval may vary as the video frame rate varies. Further, the phase of the display-write intervals with respect to the video frame rate may be arbitrary. As such, display-write operations may be performed on a first set of pixels of the display in a display-write interval of a first touch-sensing frame, while in a corresponding display-write interval of a second touch-sensing frame, display-write operations may be performed on a second set of pixels of the display that differs from the first set.

Such an arrangement of touch-sensing frames 600 permits display-write operations and capacitance measurements to be performed at different frame rates without phase locking. For example, the different frame rates may permit an active stylus's frame period to remain constant even as the video frame rate varies, or to permit use of a simple, free-running low-jitter clock source (e.g., a crystal/oscillator circuit), instead of recovering a low-jitter clock proportional to the incoming display video frame rate for touch input sensing. However, when the video frame rate lowers from the maximum video frame rate (or a threshold video frame rate), an entire image frame may not be available to be written to the display in a single touch-sensing frame. Accordingly, a portion of one or more display-write intervals may go unused. Under such conditions, the controller 208 of FIG. 2 may distribute the unused/idle time among different display-write intervals. Controller 208 may distribute the idle time in any suitable manner.

Figure 7:
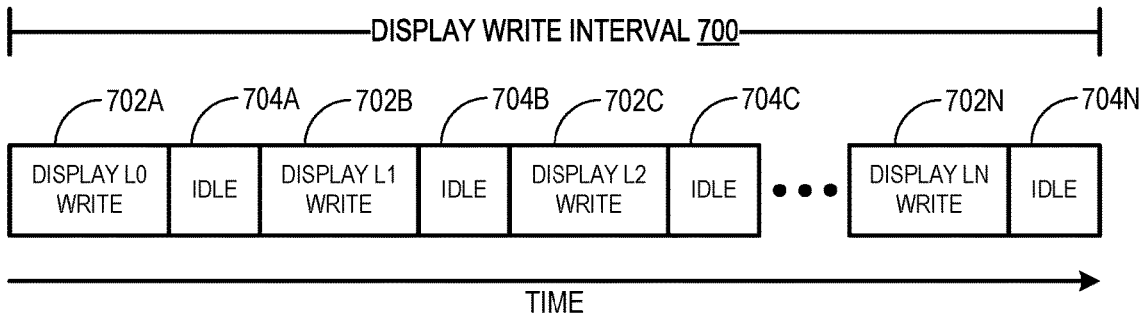
FIG. 7 shows an example display-write interval of a touch-sensing frame where idle time is evenly divided in between display-line-write operations.

Controller 208 may be configured to distribute idle time on a display-line-write operation-by-operation basis. In one example, controller 208 is configured to, in response to the video frame rate being less than a threshold video frame rate, insert an idle period in between at least some display-line-write operations in one or more display-write intervals. FIG. 7 illustrates an example display-write interval 700 of a touch-sensing frame, such as touch-sensing frame 600 shown in FIG. 6. Display-write interval 700 includes a plurality of display-line-write operations 702 (e.g., 702A, 702B, 702C, 702N), and plurality of idle periods 704 (e.g., 704A, 704B, 704C, 704N) inserted in between each display-line-write operation 702. In this example, display-line-write operations 702 may be evenly distributed across display-write interval 700. Depending on the video frame rate and the resulting amount of idle time, idle periods 704 may be inserted into a single display-write interval or multiple display-write intervals over one or more touch-sensing frames. In one example, controller 208 is configured to insert idle periods in between display-line-write operations in all display-write intervals of a touch-sensing frame.

Controller 208 may be configured to distribute idle time on a display-write interval-by-interval basis. In one example, controller 208 is configured to, in response to the video frame rate being less than a threshold video frame rate, for each display-write interval, if enough display lines of one or more image frames are available from the image source to perform display-line-write operations over the entire display-write interval, perform such display-line-write operations over the entire display-write interval. In other words, if there are enough display lines available from image source 210 (e.g., stored in display buffer 212) to perform display-line-write operations for the entire display-write interval, then those display lines are written to display 202 during the display-write interval. On the other hand, if not enough display lines of the one or more image frames are available from the image source to perform display-line-write operations over the entire display-write interval, then controller 208 may be configured to refrain from performing any display-line-write operations in the display-write interval. In other words, controller 208 skips the display-write interval and the display-write interval remains idle (i.e., no write operations are performed).

Figure 8:
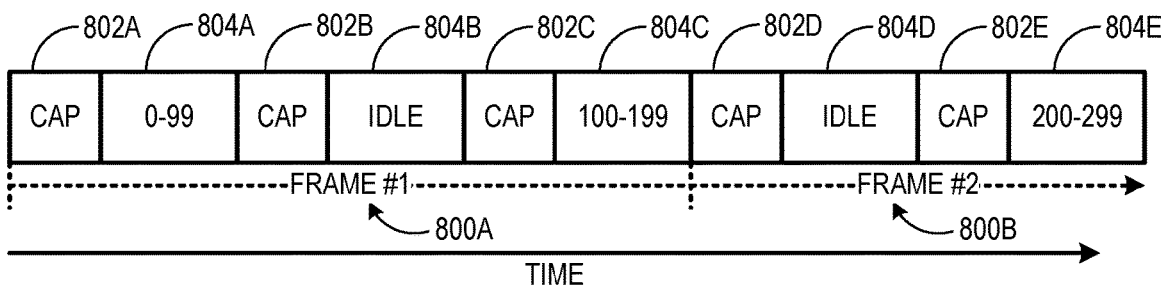
FIG. 8 shows example touch-sensing frames where idle time is divided between alternating display-write intervals.

FIG. 8 illustrates example touch-sensing frames 800 where some display-write intervals are left idle. In particular, each touch-sensing frame 800 (e.g., 800A, 800B) includes three capacitive-measurement intervals 802 (e.g., 802A, 802B, 802C in touch-sensing frame 800A) and three display-write intervals 804 (e.g., 804A, 804B, 804C in touch-sensing frame 800A). In a first display-write interval 804A of the first touch-sensing frame 800A, there are enough display lines (e.g., 100 display lines) of a 300-line image frame available in the display buffer to perform display-line-write operations for the entire display-write interval, so display lines 0-99 are written to the display in the first display-write interval. In a second display-write interval 804B of the first touch-sensing frame 800A, there are not enough display lines available in the display buffer to perform display-write operations for the entire display-write interval. As such, the second display-write interval is left idle. In a third display-write interval 804C of the first touch-sensing frame 800A, there are once again enough display lines (e.g., 100 display lines) available in the display buffer to perform display-line-write operations for the entire display-write interval. As such, display lines 100-199 are written to the display in the third display-write interval. In a first display-write interval 804D of a second touch-sensing frame 800B, there are not enough display lines available (e.g., 100 display lines) in the display buffer to perform display-write operations for the entire-display-write interval. As such, the display-write interval is left idle. In a second display-write interval 804E of the second touch-sensing frame 800B, there are once again enough display lines (e.g., 100 display lines) available in the display buffer to perform display-line-write operations for the entire display-write interval. As such, display lines 200-299 are written to the display in the second display-write interval to finish writing the image frame to the display.

Controller 208 may be configured to distribute idle time on an image frame-by-image frame basis. In one example, controller 208 is configured to, in response to the video frame rate being less than a threshold video frame rate, distribute idle time in between image frames. In particular, controller 208 is configured to, for each display-write interval, determine if an entire image frame is available from image source 210. If an entire image frame is available from image source 210, then controller 208 may perform display-line-write operations in the display-write interval, and each subsequent display-write interval until the image frame is written to the display. If not all of the image frame is available from the image source, then controller 208 may refrain from performing display-line-write operations in the display-write interval. In other words, all idle time may be placed in between image frames in what may be referred to as a vertical blanking interval. In some cases, the length of the vertical blanking interval—i.e., the number of idle display-write intervals may depend on the video frame rate of image source 210. In some cases, the length of the vertical blanking interval may be set independent of the video frame rate of image source 210.

Controller 208 may determine whether an entire image frame is available for a particular display-write interval in any suitable manner. In one example, controller 208 is configured to determine if the entire image frame is available from the image source by determining if the image source will have output the entire image frame before the end of the display-write interval based on a current video frame rate of the image source. Using this manner of determination may allow for display lines of an image frame to be written to display 202 in a display-write interval prior to the entire image frame being output from image source 210. Such an approach may reduce display lag. In another example, controller 208 is configured to determine if the entire image frame is available from the image source by determining if the entire image frame is stored in display buffer 212. Such an approach may produce more lag, but may be less complex to implement.

Figure 9:
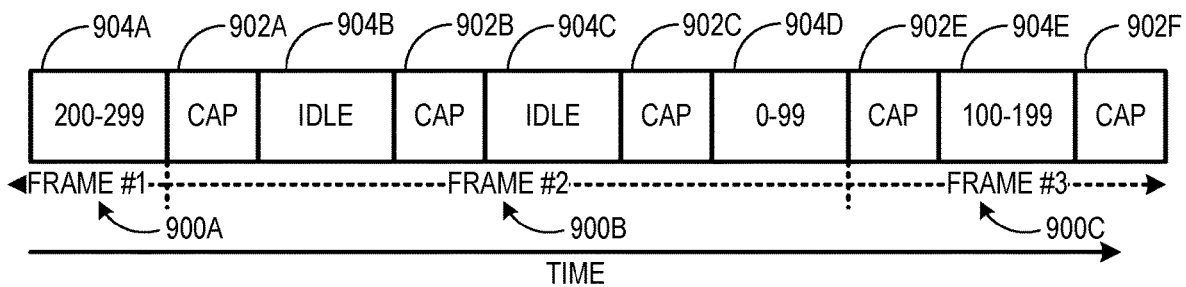
FIG. 9 shows example touch-sensing frames where idle time is placed in display-write intervals after an image frame has been written.

FIG. 9 illustrates example touch-sensing frames 900 where display-write intervals are left idle in between image frames. In particular, each touch-sensing frame 900 (e.g., 900A, 900B, 900C) includes three capacitive-measurement intervals 902 (e.g., 902A, 902B, 902C in touch-sensing frame 900B) and three display-write intervals 904 (e.g., 904A, 904B, 904C in touch-sensing frame 900B). In a first touch-sensing frame 900A, controller 208 determined that a first three-hundred-line image frame was available, and began writing display lines of the image frame in earlier display-write intervals (not shown) of the first touch-sensing frame 900A. As such, in a third display-write interval 904A of the first touch-sensing frame 900A, controller 208 writes the last 100 display lines of the first 300-line image frame to display 202. In a first display-write interval 904B of a second touch-sensing frame 900B, the first image frame has been written to display 202, and an entire second image frame is not available, so controller 208 refrains from performing display-line-write operations in the first display write interval 904B. In a second display-write interval 904C of the second touch-sensing frame 800B, the entire second image frame is still not available, so controller 208 refrains from performing display-line-write operations in the second display write interval 904C. In a third display-write interval 904D of the second touch-sensing frame 800B, the entire second image frame is available, so controller 208 performs display-line-write operations in the third display-write interval 904D, and in each subsequent display-write interval until the image frame is written to display 202.

In the examples described in FIGS. 8 and 9, entire display-write intervals are left idle. In some implementations, controller 208 may be configured to use this idle time to perform other operations. In one example, controller 208 is configured to perform capacitance measurement operations in a display-write interval if no display-line-write operations are to be performed in that interval. For example, controller 208 may perform capacitance measurements to detect passive touch input or an active stylus. In this way, the touch-sensing frame rate may be temporarily increased. In another example, controller 208 may perform capacitance measurements to determine environmental noise, such as noise voltage between a user's body and the system ground. Controller 208 may be configured to, if no display-line-write operations are performed in the display-write interval, perform any suitable operations in a display-write interval instead of leaving it idle.

Figure 10:
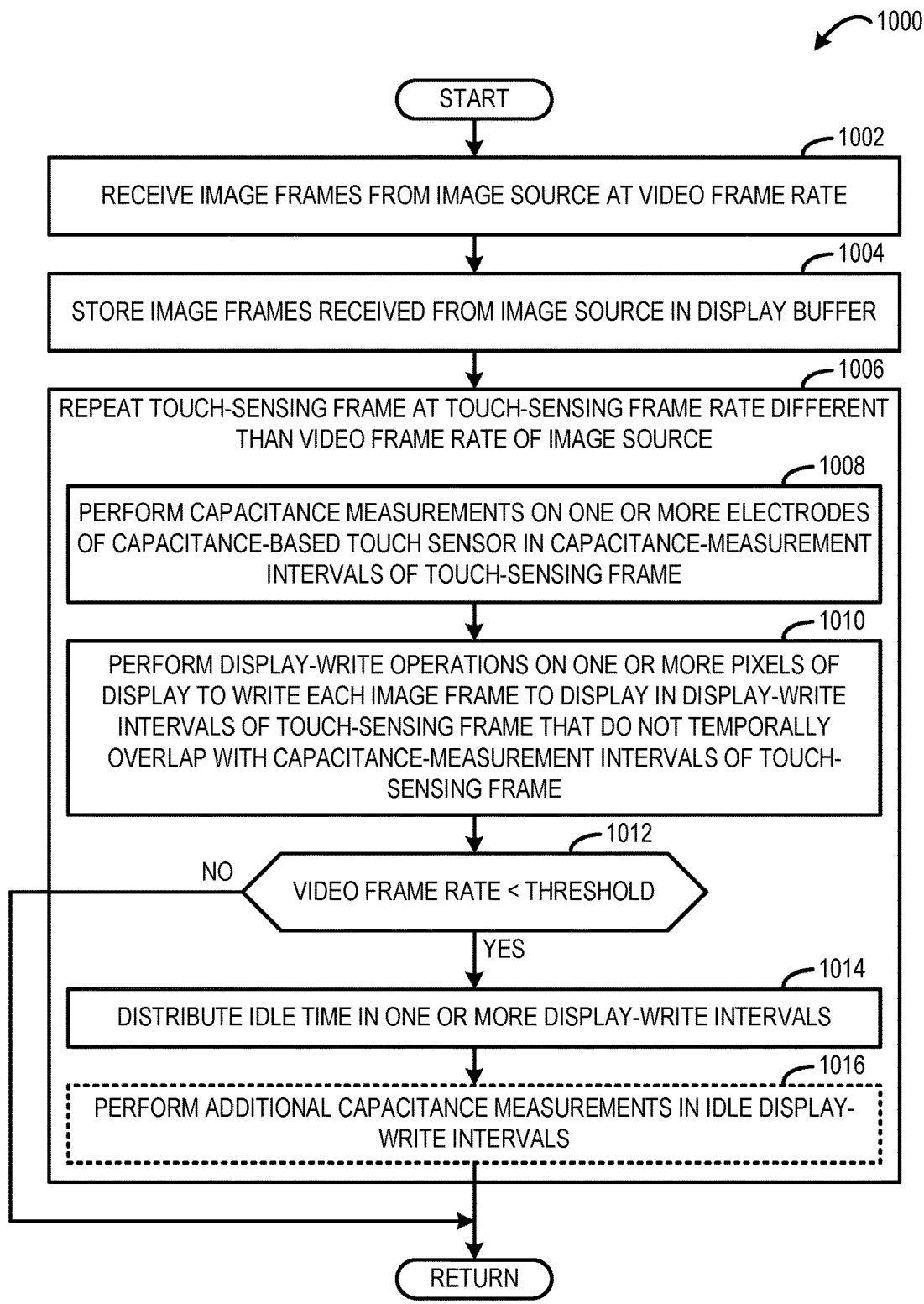
FIG. 10 shows an example method for controlling a touch-sensitive display device using touch-sensing frames that are asynchronous with a video frame rate of an image source.

FIG. 10 shows an example method 1000 for controlling a touch-sensitive display device using touch-sensing frames that are asynchronous with a video frame rate of an image source. For example, the method may be performed by a touch-sensitive display device, such as touch-sensitive display device 100 of FIGS. 1 and 2. At 1002, method 1000 includes receiving image frames from an image source of the touch-sensitive display device at a video frame rate. At 1004, method 1000 includes storing the received image frames in a display buffer. At 1006, method 1000 includes repeating a touch-sensing frame at a touch-sensing frame rate that is different than the video frame rate of the image source.

The touch-sensing frame includes capacitance-measurement intervals and display-write intervals. Accordingly, for each touch-sensing frame, at 1008, method 1000 includes performing capacitance measurements on one or more electrodes of a capacitance-based touch sensor of the touch-sensitive display device in capacitance-measurement intervals of the touch-sensing frame. At 1010, method 1000 includes performing display-write operations on one or more pixels of a display of the touch-sensitive display device to write each image frame to the display in display-write intervals of the touch-sensing frame. The display-write intervals do not temporally overlap the capacitance-measurement intervals in the touch-sensing frame.

At 1012, method 1000 includes determining if the video frame rate is less than a threshold frame rate. The threshold frame rate may be set at any suitable frame rate. In one example, the threshold frame rate is marginally less than a maximum or peak video frame rate of the image source. If the video frame rate is less than the threshold frame rate, then method 1000 moves to 1014. Otherwise, method 1000 returns to other operations.

If the video frame rate is less than the threshold frame rate, then an image frame is not made available by the image source suitable fast enough to be written to the display in a single touch-sensing frame. Instead the image frame is written to the display in display-write intervals of multiple touch-sensing frames. This results in there being idle time in one or more display-write intervals. Accordingly, at 1014, method 1000 includes distributing the idle time in one or more display-write intervals of the touch-sensing frame. In some cases, the idle time may be distributed on a display line-by-display line basis where idle periods are inserted between some display-line-write operations. In some cases, entire display-write intervals may be skipped if there are not enough display lines of the image frame available to write to the display for the entire display-write interval. In other words, the method may include refraining from performing display-write operations during some display-write intervals. In some cases, idle time may be distributed in between image frames.

At 1016, method 100 optionally may include performing additional capacitance measurements during idle display-write intervals of the touch-sensing frame where no display-line-write operations are performed. For example, such capacitance measurements may be made to temporarily increase the touch-sensing frame rate for passive touch input and/or an active stylus. In another example, such capacitance measurements may be made as part of noise cancellation operations of the touch-sensitive device. Upon distributing the idle time and/or performing the additional capacitance measurements, method 1000 may return to 1002 to repeat the method, or return to other operations.

In some implementations, the methods and processes described herein may be tied to a computing system of one or more computing devices. In particular, such methods and processes may be implemented as a computer-application program or service, an application-programming interface (API), a library, and/or other computer-program product.

Figure 11:
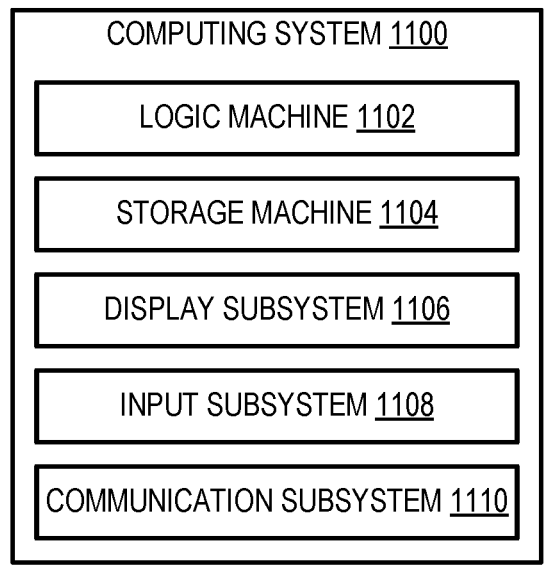
FIG. 11 shows an example computing system.

FIG. 11 schematically shows a non-limiting example of a computing system 1100 that can enact one or more of the methods and processes described above. Computing system 1100 is shown in simplified form. Computing system 1100 may take the form of one or more large-format display devices, personal computers, tablet computers, home-entertainment computers, gaming devices, mobile computing devices, mobile communication devices (e.g., smart phone), and/or other computing devices. For example, computing system 1100 may represent touch-sensitive display device 100, and in general any suitable touch-sensitive display device discussed herein.

Computing system 1100 includes a logic machine 1102, a storage machine 1104, and a display subsystem 1106. Computing system 1100 may optionally include an input subsystem 1108 and a communication subsystem 1110, and/or other components not shown in FIG. 11.

Logic machine 1102 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 1102 may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1104 includes one or more physical devices configured to hold instructions executable by the logic machine to implement the methods and processes described herein. When such methods and processes are implemented, the state of storage machine 1104 may be transformed—e.g., to hold different data.

Storage machine 1104 may include removable and/or built-in devices. Storage machine 1104 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1104 may include volatile, nonvolatile, dynamic, static, read/write, read-only, random-access, sequential-access, location-addressable, file-addressable, and/or content-addressable devices.

It will be appreciated that storage machine 1104 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1102 and storage machine 1104 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

Display subsystem 1106 may be used to present a visual representation of data held by storage machine 1104. This visual representation may take the form of a graphical user interface (GUI). As the herein described methods and processes change the data held by the storage machine, and thus transform the state of the storage machine, the state of display subsystem 1106 may likewise be transformed to visually represent changes in the underlying data. Display subsystem 1106 may include one or more display devices utilizing virtually any type of technology. Such display devices may be combined with logic machine 1102 and/or storage machine 1104 in a shared enclosure, or such display devices may be peripheral display devices.

When included, input subsystem 1108 may comprise or interface with one or more user-input devices such as a keyboard, mouse, touch screen, or game controller. In some implementations, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1110 may be configured to communicatively couple computing system 1100 with one or more other computing devices. Communication subsystem 1110 may include wired and/or wireless communication devices compatible with one or more different communication protocols. As non-limiting examples, the communication subsystem 1110 may be configured for communication via a wireless telephone network, or a wired or wireless local- or wide-area network. In some implementations, the communication subsystem 1110 may allow computing system 1100 to send and/or receive messages to and/or from other devices via a network such as the Internet.

In an example, a touch-sensitive display device comprises a capacitance-based touch sensor including a plurality of electrodes, a display including a plurality of pixels, an image source configured to output image frames at a video frame rate, and a controller configured to perform capacitance measurements on one or more electrodes of the capacitance-based touch sensor in capacitance-measurement intervals of a touch-sensing frame, and perform display-write operations on one or more pixels of the display to write each image frame to the display in display-write intervals of the touch-sensing frame that do not temporally overlap with the capacitance-measurement intervals of the touch-sensing frame, and where the controller is configured repeat the touch-sensing frame at a fixed touch-sensing frame rate that is different than the video frame rate. In this example and/or other examples, the controller may be configured to perform display-line-write operations to write display lines of each image frame to the display, and the controller may be configured to, in response to the video frame rate being less than a threshold video frame rate, insert an idle period in between at least some display-line-write operations. In this example and/or other examples, the controller may be configured to insert idle periods in between display-line-write operations in all the display-write intervals of the touch-sensing frame. In this example and/or other examples, the controller may be configured to perform display-line-write operations to write display lines of each image frame to the display, the controller may be configured to, in response to the video frame rate being less than a threshold video frame rate, for each display-write interval, (1) if enough display lines of one or more image frames are available from the image source to perform display-line-write operations over the entire display-write interval, perform such display-line-write operations over the entire display-write interval, and (2) if not enough display lines of one or more image frames are available from the image source to perform display-line-write operations over the entire display-write interval, then refrain from performing any display-line-write operations in the display-write interval. In this example and/or other examples, the controller may be configured to perform capacitance measurement operations in the display-write interval, if no display-line-write operations are performed in the display-write interval. In this example and/or other examples, the controller may be configured to perform display-line-write operations to write display lines of each image frame to the display, the controller may be configured to, in response to the video frame rate being less than a threshold video frame rate, for each display-write interval, (1) if an entire image frame is available from the image source, then perform display-line-write operations in the display-write interval, and each subsequent display-write interval until the entire image frame is written to the display, and (2) if not all of the image frame is available from the image source, then refrain from performing display-line-write operations in the display-write interval. In this example and/or other examples, the controller may be configured to determine if the entire image frame is available from the image source by determining if the image source will have output the entire image frame before an end of the display-write interval based on a current video frame rate of the image source. In this example and/or other examples, the controller may be configured to perform capacitance measurement operations in the display-write interval, if no display-line-write operations are performed in the display-write interval. In this example and/or other examples, the controller may be configured to, in a display-write interval of a first touch-sensing frame, perform display-write operations on a first set of pixels of the display, and in a corresponding display-write interval of a second touch-sensing frame, perform display-write operations on a second set of pixels of the display that differs from the first set. In this example and/or other examples, the fixed touch-sensing frame rate may be based on a frequency reference including at least one of an electronic oscillator circuit of the capacitance-based touch sensor, and a waveform of an active input device in communication with the capacitance-based touch sensor.

In an example, a method for controlling a touch-sensitive display device comprises receiving image frames output from an image source at a video frame rate, performing capacitance measurements on one or more electrodes of a capacitance-based touch sensor of the touch-sensitive display device, in capacitance-measurement intervals of a touch-sensing frame, and performing display-write operations on one or more pixels of a display of the touch-sensitive display device to write each image frame to the display in display-write intervals of the touch-sensing frame that do not temporally overlap with the capacitance-measurement intervals of the touch-sensing frame, where the touch-sensing frame is repeated at a fixed touch-sensing frame rate that is different than the video frame rate. In this example and/or other examples, performing display-write operations may include performing display-line-write operations to write display lines of each image frame to the display, and the method may further comprise, in response to the video frame rate being less than a threshold video frame rate, inserting an idle period in between at least some display-line-write operations. In this example and/or other examples, the method may include inserting idle periods in between display-line-write operations in all the display-write intervals of the touch-sensing frame. In this example and/or other examples, performing display-write operations may include performing display-line-write operations to write display lines of each image frame to the display, and the method may further comprise, in response to the video frame rate being less than a threshold video frame rate, for each display-write interval, (1) if enough display lines of one or more image frames are available from the image source to perform display-line-write operations over the entire display-write interval, performing such display-line-write operations over the entire display-write interval, and (2) if not enough display lines of the one or more image frames are available from the image source to perform display-line-write operations over the entire display-write interval, then refraining from performing any display-line-write operations in the display-write interval. In this example and/or other examples, the method may further comprise performing capacitance measurement operations in the display-write interval, if no display-line-write operations are performed in the display-write interval. In this example and/or other examples, performing display-write operations may include performing display-line-write operations to write display lines of each image frame to the display, and the method may further comprise, in response to the video frame rate being less than a threshold video frame rate, for each display-write interval, (1) if an entire image frame is available from the image source, then performing display-line-write operations in the display-write interval, and each subsequent display-write interval until the entire image frame is written to the display, and (2) if not all of the image frame is available from the image source, then refraining from performing display-line-write operations in the display-write interval. In this example and/or other examples, determining if the entire image frame is available from the image source may include determining if the image source will have output the entire image frame before the end of the display-write interval based on a current video frame rate of the image source. In this example and/or other examples, the method may further comprise performing capacitance measurement operations in the display-write interval, if no display-line-write operations are performed in the display-write interval.

In an example, a touch-sensitive display device comprises a capacitance-based touch sensor including a plurality of electrodes, a display including a plurality of pixels, an image source configured to output image frames at a video frame rate, and a controller configured to perform capacitance measurements on one or more electrodes of the capacitance-based touch sensor in capacitance-measurement intervals of a touch-sensing frame, and perform display-line-write operations on one or more lines of pixels of the display to write display lines of each image frame to the display in display-write intervals of the touch-sensing frame that do not temporally overlap with the capacitance-measurement intervals of the touch-sensing frame, in response to the video frame rate being less than a threshold video frame rate, for each display-write interval, (1) if an entire image frame is available from the image source, then perform display-line-write operations in the display-write interval, and each subsequent display-write interval until the entire image frame is written to the display, and (2) if not all of the image frame is available from the image source, then refrain from performing display-line-write operations in the display-write interval, and where the controller is configured repeat the touch-sensing frame at a fixed touch-sensing frame rate that is different than the video frame rate. In this example and/or other examples, the controller may be configured to determine if the entire image frame is available from the image source by determining if the image source will have output the entire image frame before an end of the display-write interval based on a current video frame rate of the image source.

It will be understood that the configurations and/or approaches described herein are exemplary in nature, and that these specific implementations or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A touch-sensitive display device, comprising:
a capacitance-based touch sensor including a plurality of electrodes;
a display including a plurality of pixels;
an image source configured to output image frames at a video frame rate; and
a controller configured to:
perform capacitance measurements on one or more electrodes of the capacitance-based touch sensor in capacitance-measurement intervals of a touch-sensing frame, and
perform display-write operations on one or more pixels of the display to write each image frame to the display in display-write intervals of the touch-sensing frame that do not temporally overlap with the capacitance-measurement intervals of the touch-sensing frame,
where the controller is configured to repeat the touch-sensing frame at a fixed touch-sensing frame rate that is different than the video frame rate, such that when the video frame rate is less than the fixed touch-sensing frame rate, less than one image frame is written to the display per touch-sensing frame, and when the video frame rate is greater than the fixed touch sensing frame rate, more than one image frame is written to the display per touch-sensing frame.

2. The touch-sensitive display device of claim 1, where the controller is configured to perform display-line-write operations to write display lines of each image frame to the display, and where the controller is configured to, in response to the video frame rate being less than a threshold video frame rate, insert an idle period in between at least some display-line-write operations.

3. The touch-sensitive display device of claim 2, where the controller is configured to insert idle periods in between display-line-write operations in all the display-write intervals of the touch-sensing frame.

4. The touch-sensitive display device of claim 1, where the controller is configured to perform display-line-write operations to write display lines of each image frame to the display, where the controller is configured to, in response to the video frame rate being less than a threshold video frame rate, for each display-write interval, (1) if enough display lines of one or more image frames are available from the image source to perform display-line-write operations over the entire display-write interval, perform such display-line-write operations over the entire display-write interval, and (2) if not enough display lines of one or more image frames are available from the image source to perform display-line-write operations over the entire display-write interval, then refrain from performing any display-line-write operations in the display-write interval.

5. The touch-sensitive display device of claim 4, where the controller is configured to perform capacitance measurement operations in the display-write interval, if no display-line-write operations are performed in the display-write interval.

6. The touch-sensitive display device of claim 1, where the controller is configured to perform display-line-write operations to write display lines of each image frame to the display, where the controller is configured to, in response to the video frame rate being less than a threshold video frame rate, for each display-write interval, (1) if an entire image frame is available from the image source, then perform display-line-write operations in the display-write interval, and each subsequent display-write interval until the entire image frame is written to the display, and (2) if not all of the image frame is available from the image source, then refrain from performing display-line-write operations in the display-write interval.

7. The touch-sensitive display device of claim 6, where the controller is configured to determine if the entire image frame is available from the image source by determining if the image source will have output the entire image frame before an end of the display-write interval based on a current video frame rate of the image source.

8. The touch-sensitive display device of claim 6, where the controller is configured to perform capacitance measurement operations in the display-write interval, if no display-line-write operations are performed in the display-write interval.

9. The touch-sensitive display device of claim 1, where the controller is configured to, in a display-write interval of a first touch-sensing frame, perform display-write operations on a first set of pixels of the display, and in a corresponding display-write interval of a second touch-sensing frame, perform display-write operations on a second set of pixels of the display that differs from the first set.

10. The touch-sensitive display device of claim 1, where the fixed touch-sensing frame rate is based on a frequency reference including at least one of an electronic oscillator circuit of the capacitance-based touch sensor, and a waveform of an active input device in communication with the capacitance-based touch sensor.

11. A touch-sensitive display device, comprising:
a capacitance-based touch sensor including a plurality of electrodes;
a display including a plurality of pixels;
an image source configured to output image frames at a video frame rate; and
a controller configured to:
perform capacitance measurements on one or more electrodes of the capacitance-based touch sensor in capacitance-measurement intervals of a touch-sensing frame, and
perform display-line-write operations on one or more lines of pixels of the display to write display lines of each image frame to the display in display-write intervals of the touch-sensing frame that do not temporally overlap with the capacitance-measurement intervals of the touch-sensing frame,
in response to the video frame rate being less than a threshold video frame rate, for each display-write interval, (1) if an entire image frame is available from the image source, then perform display-line-write operations in the display-write interval, and each subsequent display-write interval until the entire image frame is written to the display, and (2) if not all of the image frame is available from the image source, then refrain from performing display-line-write operations in the display-write interval, and
where the controller is configured repeat the touch-sensing frame at a fixed touch-sensing frame rate that is different than the video frame rate.

12. The touch-sensitive display device of claim 11, where the controller is configured to determine if the entire image frame is available from the image source by determining if the image source will have output the entire image frame before an end of the display-write interval based on a current video frame rate of the image source.

13. The touch-sensitive display device of claim 1, wherein the controller comprises a plurality of processing devices.

14. The touch-sensitive display device of claim 13, wherein the controller comprises a plurality of processing devices.

* * * * *